US012655501B2

(12) United States Patent
Reydet et al.

(10) Patent No.: US 12,655,501 B2
(45) Date of Patent: Jun. 16, 2026

(54) NICKEL-BASED ALLOY FOR MANUFACTURING PIPELINE TUBES

(71) Applicant: Aperam, Luxembourg (LU)

(72) Inventors: Pierre-Louis Reydet, Urzy (FR); Fanny Jouvenceau, Saint Parize le Chatel (FR)

(73) Assignee: APERAM, Luxembourg (LU)

( * ) Notice: Subject to any disclaimer, the term of this patent is extended or adjusted under 35 U.S.C. 154(b) by 230 days.

(21) Appl. No.: 18/251,241

(22) PCT Filed: Oct. 30, 2020

(86) PCT No.: PCT/IB2020/060223
§ 371 (c)(1),
(2) Date: Apr. 30, 2023

(87) PCT Pub. No.: WO2022/090781
PCT Pub. Date: May 5, 2022

(65) Prior Publication Data
US 2025/0277289 A1 Sep. 4, 2025

(51) Int. Cl.
*C22C 19/05* (2006.01)
*B21C 1/02* (2006.01)
(Continued)

(52) U.S. Cl.
CPC .............. *C22C 19/055* (2013.01); *B21C 1/02* (2013.01); *B22F 9/082* (2013.01);
(Continued)

(58) Field of Classification Search
CPC ........ C22C 19/056; C22C 19/055; C22F 1/10
See application file for complete search history.

(56) References Cited

U.S. PATENT DOCUMENTS 5,019,184 A 5/1991 Crum et al.
6,280,540 B1 * 8/2001 Crook ................... C22C 19/055
420/443
(Continued)

FOREIGN PATENT DOCUMENTS

CN 109514046 A 3/2019
CN 111575536 A 8/2020
(Continued)

OTHER PUBLICATIONS

Davis, et al. ASM International, Materials Park Ohio, Properties and Selection: Nonferrous Alloys and Special Purpose Materials: "Rare Earth Metals", Oct. 1990, pp. 720-732.*
(Continued)

*Primary Examiner* — Jessee R Roe
(74) *Attorney, Agent, or Firm* — MARSHALL, GERSTEIN & BORUN LLP

(57) ABSTRACT

The disclosure relates to an alloy having the following composition, by weight:

$$16.5\% \leq Cr \leq 25.0\%$$
$$11.0\% \leq Mo \leq 18.0\%$$
$$2.0\% \leq W \leq 7.0\%$$
$$Fe \leq 1.0\%$$
$$Mo + W \leq -0.5 \times (Cr + Fe) + 30\%$$
$$Mo + W \geq -0.5 \times (Cr + Fe) + 25\%$$
$$Ti + Ta \leq 0.80\%$$
$$0.01\% \leq Si \leq 0.75\%$$

(Continued)

-continued 0.01% ≤ Al ≤ 0.35%

0.01% ≤ Mn ≤ 0.35%

Ca ≤ 0.005%

Mg ≤ 0.005%

Nb ≤ 0.01%

0.001% ≤ C ≤ 0.05%

0.001% ≤ N ≤ 0.05%

S ≤ 0.003%

P ≤ 0.005% optionally, 0.0010%≤rare earths≤0.015%, the silicon content being less than or equal to 0.25% in the presence of rare earths at a content comprised between 0.0010% and 0.015%, the rest being nickel and unavoidable impurities resulting from the manufacturing, the nickel content being greater than or equal to 54%.

20 Claims, 6 Drawing Sheets

(51) Int. Cl.

| | | |
|---|---|---|
| *B22F 9/08* | (2006.01) | |
| *B23K 35/02* | (2006.01) | |
| *B23K 35/30* | (2006.01) | |
| *B33Y 10/00* | (2015.01) | |

(52) U.S. Cl.
  CPC ........ *B23K 35/0261* (2013.01); *B23K 35/304* (2013.01); *B33Y 10/00* (2014.12); *B22F 2202/13* (2013.01); *B22F 2301/15* (2013.01); *B22F 2999/00* (2013.01)

(56) References Cited

U.S. PATENT DOCUMENTS

| | | | |
|---|---|---|---|
| 6,447,716 | B1 | 9/2002 | Cozar et al. |
| 2015/0159241 | A1* | 6/2015 | Hamaguchi ............. C22C 30/00 |
| | | | 420/443 |
| 2019/0055627 | A1 | 2/2019 | Nagatomi et al. |
| 2020/0087759 | A1 | 3/2020 | Masaki et al. |

FOREIGN PATENT DOCUMENTS

| | | | |
|---|---|---|---|
| EP | 3511081 A1 | 7/2019 | |
| EP | 3511082 A1 | 7/2019 | |
| JP | 51-134341 | 11/1976 | |
| JP | 03-068745 | 3/1991 | |
| JP | 2003-027189 A | 1/2003 | |
| JP | 2015-183290 A | 10/2015 | |
| KR | 2000-0047839 A | 7/2000 | |
| KR | 2018-0040513 A | 4/2018 | |
| WO | WO-2012/028703 A1 | 3/2012 | |
| WO | WO-2017/106189 A1 | 6/2017 | |

OTHER PUBLICATIONS

G L Swales et al: "Nickel-containing alloy piping for offshore oil and gas production Introduction", England, Dec. 31, 2002 (Dec. 31, 2002), XP055753941, UK.
P. Zumpano et al.: "Welding and NDT of Alloy 625 as CRA in Offshore Pipelines and Risers", Rio Pipeline Conference & Exposition 2013, Sep. 24, 2013 (Sep. 24, 2013), Sep. 26, 2013 (Sep. 26, 2013), pp. 1-9, XP002801212.
PCT/IB2020/060223; International Search Report mailed Dec. 8, 2020.

* cited by examiner

26

28

30

40

NICKEL-BASED ALLOY FOR MANUFACTURING PIPELINE TUBES

FIELD OF THE DISCLOSURE

The present invention relates to a nickel alloy intended for being used in particular in the field of petrochemistry and of the extraction of petroleum products, and more particularly as part of the manufacture of pipeline tubes for the transport of gas or oil.

BACKGROUND

The exploitation of gas and oil requires the laying of pipelines at sea. For productivity and economic profitability reasons, it is desired to lay the pipelines at a laying speed of about 2 km/day. There are currently three technologies which meet such productivity requirements:

S-lay technology: pipe sections, typically 9 m or 12 m long, are manufactured ashore in units called a spool-base, then transported at sea on ships to be butt-welded, horizontally on a barge. The laying is called S-lay so as to remind the shape taken by the tube before touching the seabed. The S-lay technology is suitable for seabeds at less than 2,000 m.

J-lay Technology: The J-lay technology is more recent and adapted to deep waters (2,000 m to 4,000 m). The pipe sections are welded together at sea on a vertical barge (with a slight angle) and have a J-shape before touching the seabed.

R-lay Technology: The most recent, the R-lay technology is dedicated to small diameter tubes and not very deep water. The line of tubes is integrally welded on land, then wound on a wheel to be transported at sea before being unwound thereon by means of specific barges. The R-lay technology is the most efficient.

Such laying techniques impose mechanical stresses on the tubes, and in particular on the orbital welds between tube sections, in particular under the effect of the bending of the tube during laying and under the effect of the weight of the tube before touching the seabed. The tubes, and in particular the welds, thus have to be designed to withstand such stresses to avoid the deformation of the tubes during the laying phases.

In addition to the requirements in terms of laying speed, there is also a necessary increase in laying depths in order to seek the deposits still available. The laying depths can reach about 2,500 m to 3,000 m deep. Such increase in the laying depth increases the mechanical stresses exerted on the tubes, and thus requires the use of carbon steels with increasingly higher mechanical properties.

The tube sections used are typically manufactured in a workshop by rolling steel sheets and then longitudinal welding of the edges of the sheets by means of the MIG/MAG process with a steel filler wire, the composition of which is chosen according to the grade of the sheets. The wall thickness of the tube sections is typically of the order of 25 mm and the diameter thereof is comprised between 25 cm and 130 cm.

According to an alternative, and depending on the application, the tube sections are manufactured by billet extrusion. The tube sections, as well as the tubes obtained by orbital welding of the tube sections, are in such case without any longitudinal welding (seamless tube).

The mechanical strength of the pipe sections specified according to the grade of steel is recalled below, according to API Specification 5 L, for steel grades X56, X60, X65, X70 or X80 which can be used for the manufacture of the pipe sections. The steel grade corresponds to the yield strength of the sheets, in ksi units.

| Grade | Minimum yield strength | | Minimum tensile strength | |
|---|---|---|---|---|
| | ksi | MPa | ksi | MPa |
| X56 | 56.0 | 386 | 71.0 | 489 |
| X60 | 60.0 | 413 | 75.0 | 517 |
| X65 | 65.0 | 448 | 77.0 | 530 |
| X70 | 70.0 | 482 | 82.0 | 565 |
| X80 | 80.0 | 551 | 90.0 | 620 |

Steel grades X56, X60, X65, X70 or X80 are defined in the American Petroleum Institute's "API Specification 5 L" document, 45$^{th}$ edition, December 2012.

In the case where the tube sections comprise a longitudinal weld, it is sought, during the manufacture of the tube sections, to obtain welds with mechanical properties equal to or greater than the mechanical properties of the base plate steel (overmatching) so as to be able to design the pipe sections, for example to define the thickness of the pipe sections and the grade of the steel used, depending on the laying conditions (S, J, R) and on the type of operation of the line only, without having to take the welds into account.

In the case where the tube sections are manufactured without longitudinal welding, for example by extrusion of billets ("seamless" technology), it is possible to dispense with the specifications required for longitudinal welds ("overmatching").

After the tube sections have been manufactured, the inner surface of the tube sections, including any longitudinal welds, is coated with a coating layer by welding with a filler wire. The purpose of this coating operation is to ensure the corrosion resistance of the tube during the transport of more or less corrosive petroleum products. The inner coating is typically made of Inconel® 625 alloy. Inconel® 625 alloy has the following composition, by weight:

Cr: 20.0–23.0%

Fe ≤ 5.0%

Mo: 8.0–10.0%

Nb + Ta: 3.15–4.15%

C ≤ 0.10%

Mn ≤ 0.50%

Si ≤ 0.50%

P ≤ 0.002%

S ≤ 0.015%

Al ≤ 0.40%

Ti ≤ 0.40%

Other elements ≤ 0.5%, the rest being nickel and unavoidable impurities resulting from the manufacturing, with Ni≥58%.

Inconel® 625 alloy is defined in Table 1 of the standard AWS A5.14/A5.14M: 2018 (Specification for Nickel and Nickel-Alloy Bare Welding Electrodes and Rods), entitled "Chemical composition requirements for Nickel and Nickel- Alloy Electrodes and Rods" under the AWS classification reference ERNiCrMo-3 (number UNS N06625).

Once the tube sections are manufactured, they are transported on a barge and butt-welded by orbital welding as the tubes are laid using one of the aforementioned techniques.

SUMMARY

Whatever the laying technique used, the butt welds (orbital) made between the tube sections should withstand the bending stresses of the line during laying and the own weight of the line before touching the seabed. The mechanical strength of the orbital welds is thus of primary importance in preventing weld deformation during the laying phases.

In general, the following properties are sought for orbital welds between pipe sections:

Overmatching: one seeks to obtain orbital welds with a mechanical strength greater than or equal to the mechanical strength of the base metal, i.e. of the steel of the pipe section. As mentioned hereinabove with regard to the longitudinal welds of the pipe sections, overmatching is used for designing the pipes, and in particular for defining the thickness of the pipe and the grade of the steel used, depending on the laying conditions (S, J, R) and on the type of operation of the line without having to take into account the welds.

a localized corrosion resistance greater than or equal to the corrosion resistance of the coating of the pipe section, on the inside, in order to be able to design the pipes with regard to the requirements in terms of localized corrosion resistance without taking into account the existence of orbital welds.

Throughout the description, localized corrosion refers to corrosion likely to develop pitting mechanisms.

In order to meet all the hereinabove-mentioned requirements, we proposed to produce orbital welds wherein the root pass, at the coating, is made using an Inconel® 625 alloy filler wire, and to finish the weld with filling passes using steel of a grade equivalent to the base metal. Such welding technique provides good mechanical properties because it ensures a certain continuity of the materials used. On the other hand, such welding comes with significant problems of hot cracking, and hence weldability, related to the dilution of the Inconel® 625 alloy. Such a solution is thus not entirely satisfactory. In particular, the cracks appearing during welding have to be repaired, which generates a considerable additional cost. Furthermore, if the cracks are not repaired, the cracks carry the risk of generating tube breaking during operation.

We have also been proposed to perform the entire weld using a single wire made of Inconel® 625 alloy. Such welding solution is in fact economical. Furthermore, said welding does not generate any problem of hot cracking, and leads to a resistance to corrosion which is comparable to the resistance of the coating. Also, said welding is widely used for welding tubes up to grade X56 or even X60. However, it is no longer suitable for higher steel grades (X65, X70 and X80). However, the aforementioned requirements, more particularly in terms of speed and depth of laying, increasingly require the use of steels of grades higher than grade X60, and in particular of grade X65 steel or even grade X70 steel.

A goal of the invention is thus to overcome the above drawbacks and to provide an alloy which can used as a filler material for the manufacture of pipeline tubes intended for the transport of oil or gas and suitable for laying in deep water, off-shore, and in particular down to about 3,000 m of depth, at high productions rates, in particular on the order of 2 km/day.

The laying of the tubes at depths down to about 3,000 m, as well as the high laying rates, require the use of a steel with very good mechanical properties. Preferably, with regard to the mechanical properties of the welded assemblies, it is sought to obtain, at a minimum: a yield strength $Rp_{0.2}$ greater than or equal to 500 MPa and a KCV resilience greater than or equal to 100 J/cm$^2$ and advantageously a yield strength $RP_{0.2}$ greater than or equal to 550 MPa and/or a KCV resilience greater than or equal to 120 J/cm$^2$.

Moreover, the use of tubes as pipelines for the transport of oil or gas requires a good corrosion resistance of the filler material, as well as good weldability. More particularly, localized corrosion resistance and weldability are sought to be greater than or equal to those of the Inconel® 625 alloy.

To this end, the invention relates to an alloy having the following composition, by weight:

$$16.5\% \leq Cr \leq 25.0\%$$
$$11.0\% \leq Mo \leq 18.0\%$$
$$2.0\% \leq W \leq 7.0\%$$
$$Fe \leq 1.0\%$$
$$Mo + W \leq -0.5 \times (Cr + Fe) + 30\%$$
$$Mo + W \geq -0.5 \times (Cr + Fe) + 25\%$$
$$Ti + Ta \leq 0.80\%$$
$$0.01\% \leq Si \leq 0.75\%$$
$$0.01\% \leq Al \leq 0.35\%$$
$$0.01\% \leq Mn \leq 0.35\%$$
$$Ca \leq 0.005\%$$
$$Mg \leq 0.005\%$$
$$Nb \leq 0.01\%$$
$$0.001\% \leq C \leq 0.05\%$$
$$0.001\% \leq N \leq 0.05\%$$
$$S \leq 0.003\%$$
$$P \leq 0.005\%$$

optionally, 0.0010%≤rare earths≤0.015%, the silicon content being less than or equal to 0.25% in the presence of rare earths at a content comprised between 0.0010% and 0.015%, the rest being nickel and unavoidable impurities resulting from the manufacturing, the nickel content being greater than or equal to 54%.

The alloy according to the invention can comprise one or a plurality of the following features, taken individually or according to any technically possible combination(s):

the iron content is less than or equal to 0.5%;

rare earths are chosen from yttrium, cerium and lanthanum and mixtures thereof; and the rare earths are chosen from yttrium or a mixture of cerium and lanthanum.

The invention further relates to a coated part comprising a substrate made of a base material and a coating made of an alloy according to any of claims 1 to 4, the base material being a metallic material, preferably a carbon steel, and for example an X56, X60, X65 or X70 steel.

According to a particular example, the coated part is a tube section.

The invention further relates to a filler wire made of an alloy as described hereinabove.

The invention relates to a method for manufacturing the filler wire described hereinabove, comprising the following steps:

supply of a semi-finished product made of an alloy as described hereinabove;

hot transformation of the semi-finished product, for forming an intermediate wire; and transformation of the intermediate wire into filler wire, with a diameter smaller than that of the intermediate wire, said transformation comprising a drawing step.

The invention further relates to a welded assembly comprising at least two portions of parts, each of which is made of a base material, the parts of the parts being joined together by a weld bead obtained from the filler wire as described hereinabove, the base material being selected from an iron-nickel alloy such as Fe-9Ni, a nickel alloy such as C-276, C-4 or 22 and a carbon steel, for example a X56, X60, X65 or X70 steel.

The welded assembly according to the invention can further comprise one or a plurality of the following features, taken individually or according to any technically possible combination(s):

the welded assembly forms a tube section comprising a sheet metal bent into the shape of a tube, the longitudinal edges of which form the portions of parts, joined together by the weld bead;

the tube section is provided with a coating made of the alloy as described hereinabove, over at least a part, and preferably all, of the inner surface thereof; and the welded assembly forms a tube comprising at least two tube sections, the tube sections forming the portion of parts, and the weld bead extending along the circumference of the tube, the tube sections preferably being tube sections as described hereinabove.

The invention further relates to a method for manufacturing a welded assembly comprising welding together the two portions of parts by means of the filler wire as described hereinabove, the welding being in particular arc welding.

The manufacturing method according to the assembly can further have one or a plurality of the following features, taken individually or according to any technically conceivable combination(s):

the welding step is a step of welding together the longitudinal edges of the sheet metal, the weld preferably being a longitudinal butt weld; and The method comprises, prior to the welding step, the following successive steps:

supplying a first tube section and a second tube section, each extending along a longitudinal axis, and made of the base material;

positioning of the first and second tube sections in such a way that a longitudinal end of the first tube section is arranged facing a longitudinal end of the second tube section along the longitudinal axis of the first and second tube sections; and the welding step is a step of welding together two longitudinal ends facing the first and second tube sections, the welding preferably being orbital butt welding.

The invention further relates to a part or portion of a part made of an alloy as described hereinabove, said part or portion of a part being produced by additive manufacturing.

The additive manufacturing process uses, more particularly, as filler material, a filler wire made of the alloy as described hereinabove and/or a powder made of the alloy as described hereinabove.

The additive manufacturing process is, for example, an additive manufacturing process using an electric arc, a laser beam and/or an electron beam as an energy source for melting the filler material.

For example, the additive manufacturing process is a wire-arc, wire-laser, electron beam-wire process or a hybrid additive manufacturing process combining wire-arc and laser-powder or wire-arc and wire-laser technologies.

The invention further relates to a method for manufacturing a part or portion of a part comprising a step of manufacturing said part or portion of a part by a metallic additive manufacturing process using, as filler material, a filler wire made of the alloy as described hereinabove and/or a powder made of the alloy as described hereinabove.

The additive manufacturing process is, for example, an additive manufacturing process using an electric arc, a laser beam and/or an electron beam as an energy source for melting the filler material.

For example, the additive manufacturing process is a wire-arc, wire-laser, electron beam-wire process or a hybrid additive manufacturing process combining wire-arc and laser-powder or wire-arc and wire-laser technologies.

The invention further relates to a use of the filler wire as described hereinabove:

as a welding filler wire for welding together two portions of parts, made of a base material, the base material being an iron-nickel alloy such as Fe-9Ni, a nickel alloy such as C-276, C-4 or 22, or a carbon steel, and in particular a X56, X60, X65 or X70 steel; and/or as a hardfacing wire for producing a coating on parts or portions of parts, made of a metallic base material, the base material preferably being a carbon steel, and for example a X56, X60, X65 or X70 steel; and/or as filler wire in a metal additive manufacturing process.

The invention further relates to a metal powder made of an alloy as described hereinabove. The invention further relates to a method for manufacturing the metal powder made of an alloy as described hereinabove.

BRIEF DESCRIPTION OF THE DRAWINGS

The invention will be better understood upon reading the following description, given only as an example and making reference to the enclosed drawings, amongst which.

DETAILED DESCRIPTION

Figure 1:
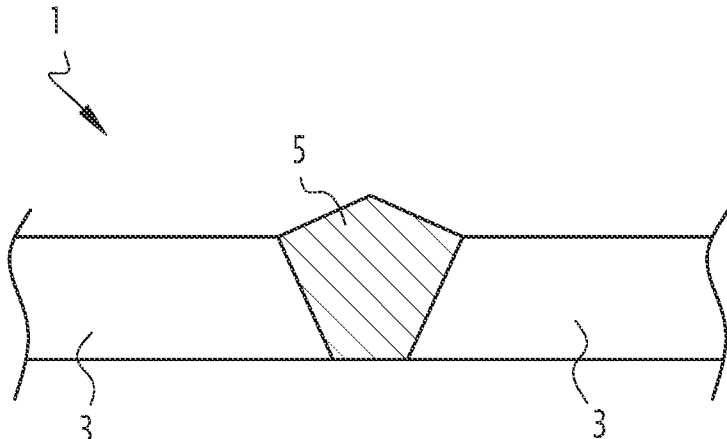
FIG. 1 is a schematic section view of a welded assembly according to the invention.

Hereinafter in the description, all the contents are expressed as percentage by weight.

The alloy according to the invention has the following composition, by weight:

$$16.5\% \leq Cr \leq 25.0\%$$

$$11.0\% \leq Mo \leq 18.0\%$$

$$2.0\% \leq W \leq 7.0\%$$

$$Fe \leq 1.0\%$$

$$Mo + W \leq -0.5 \times (Cr + Fe) + 30\%$$

$$Mo + W \geq -0.5 \times (Cr + Fe) + 25\%$$

$$Ti + Ta \leq 0.80\%$$

$$0.01\% \leq Si \leq 0.75\%$$

$$0.01\% \leq Al \leq 0.35\%$$

$$0.01\% \leq Mn \leq 0.35\%$$

$$Ca \leq 0.005\%$$

$$Mg \leq 0.005\%$$

$$Nb \leq 0.01\%$$

$$0.001\% \leq C \leq 0.05\%$$

$$0.001\% \leq N \leq 0.05\%$$

$$S \leq 0.003\%$$

$$P \leq 0.005\%$$

optionally, $0.0010\% \leq$ rare earths $\leq 0.015\%$, the silicon content being less than or equal to 0.25% in the presence of rare earths at a content comprised between 0.0010% and 0.015%, the rest being nickel and unavoidable impurities resulting from the manufacturing, the nickel content being greater than or equal to 54%.

Unavoidable impurities resulting from the manufacturing refer to elements which are present in the raw materials used to make the alloy or which come from the equipment used to make the alloy, for example from the refractories of furnaces. Such residual elements have no metallurgical effect on the alloy.

In the alloy, the nickel content greater than or equal to 54% by weight provides a good ductility of the matrix and a good resistance to stress corrosion.

At a content comprised between 16.5% and 25.0% by weight, chromium provides a good resistance to generalized corrosion and improves the mechanical properties of the alloy. More particularly, the inventors have found that the resistance to generalized corrosion is insufficient when the chromium content is less than 16.5% by weight. Moreover, a chromium content of more than 25.0% by weight results in a precipitation of the $\sigma$ phase, associated with a loss of ductility and an increased sensitivity to hot cracking, and thus results in degraded mechanical properties of the alloy.

Preferably, the chromium content is greater than or equal to 17.0% and less than or equal to 23.0%.

Present in contents comprised between 11.0% and 18.0% by weight, molybdenum improves the resistance to localized corrosion.

Moreover, molybdenum considerably improves the mechanical properties. The inventors have found that, for molybdenum contents of less than 11.0% by weight, the resistance to localized corrosion and the mechanical properties are insufficient, whereas a molybdenum content of more than 18% results in a precipitation of the undesirable phases, resulting in a loss of ductility and increased sensitivity to hot cracking.

Preferably, the molybdenum content is greater than or equal to 11.5% and less than or equal to 16.5%.

The tungsten content is between 2.0% and 7.0% by weight. Present in such contents, tungsten also improves the resistance to localized corrosion. Furthermore, tungsten improves the mechanical properties. The inventors have found that, for tungsten contents of less than 2.0%, the resistance to localized corrosion is insufficient. Moreover, a tungsten content greater than 7.0% results in a precipitation of the undesirable phases, resulting in a loss of ductility and an increased sensitivity to hot cracking.

The iron content is less than or equal to 1.0% by weight. The addition of iron degrades the resistance to generalized corrosion. An iron content of less than or equal to 1.0% by weight allows the alloy to be produced from scrap materials containing a residual iron content, which reduces the manufacturing cost. At a content greater than 1.0% by weight, iron also enhances the precipitation of undesirable phases, resulting in a loss of ductility and an increased sensitivity to hot cracking.

Preferably, the iron content is less than or equal to 0.5% by weight.

The sum of the titanium and tantalum contents is less than or equal to 0.80% by weight. Titanium and tantalum, present at the claimed levels, greatly improve the mechanical properties, but the low solubility thereof in Ni—Cr alloys generates undesirable phase precipitations. Therefore, the contents of these elements have to be limited to low contents. However, they contribute to the deoxidation of the alloy during the manufacturing. The inventors have found that, when Ti+Ta is greater than 0.80% by weight, precipitation of undesirable phases is observed, resulting in a loss of ductility and in an increased sensitivity to hot cracking.

According to the invention, $Mo+W \leq -0.5 \times (Cr+Fe)+30\%$ by weight. The inventors have observed that satisfying the above relationship leads to obtaining satisfactory ductility, expressed in particular by a breaking energy $KCV \geq 100$ $J/cm^2$, as well as good weldability, expressed by a total crack length of less than or equal to 20 mm.

The breaking energy KCV is expressed in $J/cm^2$. The breaking energy KCV reflects the resilience of the part. It is for example determined by resilience tests carried out as per the standard NF EN ISO 148-1 (January 2011) at room temperature.

The crack length is determined in particular by Varestraint tests according to the European standard FD CEN ISO/TR 17641-3 (November 2005) under 3.2% plastic deformation.

Furthermore, $Mo+W \geq -0.5 \times (Cr+Fe)+25\%$ by weight. The inventors have found that satisfying the above relationship leads to obtaining a satisfactory mechanical strength, and in particular a yield strength $Rp_{0.2}$ greater than or equal to 500 MPa.

At the aforementioned levels, silicon and aluminum enhance deoxidation and manganese enhances desulphurization during alloy manufacturing.

The calcium and magnesium contents in the alloy are each limited to 0.005% by weight so as not to degrade the weldability. More particularly, the calcium and magnesium contents are limited so as not to degrade the quality of the weld seams and in particular the formation of slag at the surface producing instabilities in the arc and in the liquid bath.

The niobium content is less than or equal to 0.01% by weight. The niobium content in the alloy is limited so as not to degrade the resistance to hot cracking. In particular, niobium segregates strongly in interdendritic spaces and enhances the precipitation of undesirable phases.

The alloy further contains carbon and nitrogen at contents comprised between 0.001 and 0.05% by weight. The carbon is controlled in order to facilitate deoxidation during alloy manufacturing.

Furthermore, carbon and nitrogen also ensure the refinement of microstructures, by the precipitation of Ti—(C, N) carbonitrides if they are associated with the addition of titanium.

To improve the resistance to hot cracking, the S and P contents are limited as much as possible. Said contents are less than or equal to 0.003% by weight and to 0.005% by weight, respectively, in the alloy described hereinabove.

Optionally, the alloy comprises rare earths at a content comprised between 0.0010 and 0.015% by weight. Rare earths trap sulfur and residual oxygen. Rare earths improve the resistance to hot cracking when welding a base metal containing higher residual S+O contents than the welding wire. However, at a content greater than 0.015%, they enhance the precipitation of eutectic phases with a low melting point, in particular in the presence of silicon, which results in a loss of ductility and in an increased sensitivity to hot cracking.

The rare earths are preferably chosen from yttrium, cerium and lanthanum, or from mixtures of said elements.

According to one example, rare earths consist of yttrium. In such case, the alloy comprises between 0.0010 and 0.015% by weight of yttrium.

According to one variant, the rare earths consist of a mixture of cerium and lanthanum. In such case, the content of Ce+La in the alloy is comprised between 0.0010 and 0.015% by weight.

In the presence of rare earths at a content comprised between 0.0010 and 0.015% by weight, the silicon content is limited to 0.25% by weight, and preferably to 0.20% by weight. In such case, the silicon content is thus comprised between 0.01 and 0.25% by weight, and preferably between 0.01 and 0.20% by weight. Indeed, silicon enhances the formation of phases containing rare earths, which reduces the availability of rare earths for trapping residual sulfur and oxygen.

The alloy according to the invention has a yield strength $Rp_{0.2}$ comprised between 500 MPa and 600 MPa and a KCV resilience greater than or equal to 100 J/cm$^2$, which can be used for obtaining ductile welds exhibiting an overmatching of the mechanical properties compared to a base material made of X56, X60, X65 or X70 steel.

As mentioned hereinabove, steel grades X56, X60, X65, X70 or X80 are defined in the American Petroleum Institute's API Specification 5 L document, 45$^{th}$ edition, December 2012.

Moreover, the alloy according to the invention has:

a good resistance to corrosion, in particular a resistance to localized corrosion greater than or equal to the resistance of the comparative Inconel® 625 alloy;

a weldability greater than or equal to the weldability of the comparative Inconel® 625 alloy.

Thereby, the characteristics of longitudinal and/or orbital welds can be ignored for the design of welded joints designed to have a yield strength $Rp_{0.2}$ greater than or equal to 500 MPa and a KCV resilience greater than or equal to 100 J/cm$^2$, and comprising in particular the X56, X60, X65 and X70 steels as base materials.

Taking into account the properties thereof, the alloy according to the invention is thus particularly suitable for use as filler material for the manufacture of pipeline tubes intended for the transport of oil or gas and suitable for laying in international waters at deep-sea, and in particular down to about 3,000 m of depth, at high productions rates, in particular on the order of 2 km/day.

Such alloy can thus be advantageously used as filler material for longitudinal and/or orbital welds of pipeline tubes made of X56, X60, X65 or X70 steel, and intended for being laid at considerable depths, for example down to 3,000 m of depth and for high laying rates.

Given the good properties of resistance to corrosion, the alloy can also be used to produce the inner coating intended for improving the resistance to corrosion of such tubes.

The alloy according to the invention can be obtained by any suitable method known to a person skilled in the art.

As an example, in a first step, starting materials are fed into an electric arc furnace. The starting materials are chosen so as to obtain an alloy containing less than 1.0% by weight of iron. The above are in particular new materials. Then, the starting materials are melted in the electric arc furnace, then vacuum oxygen decarburization (VOD) is carried out by the usual methods, in order to obtain:

a decarburization by oxygen blowing and vacuum pumping (on the order of a few mbar);

a deoxidation and desulphurization under lime slag; and an adjustment of reducing elements such as Ti and Al.

The invention further relates to a filler wire made of an alloy having a composition as described hereinabove.

Such a filler wire is in particular suitable for use in TIG or Plasma welding processes with filler wire or in the MIG/MAG welding process.

For example, the filler wire is intended to be used:

as a welding filler wire for welding together two portions of parts, made of a base material, the base material being in particular an iron-nickel alloy such as Fe-9Ni, i.e. containing nickel in a content comprised between 5% and 10% by weight, or a nickel alloy such as C-276, C-4 or 22, or a carbon steel, and in particular a X56, X60, X65 or X70 steel; and/or as a hardfacing wire, for producing a coating, in particular on parts or portions of parts, made of a base material, the base material being a carbon steel, and in particular a X56, X60, X65 or X70 steel.

The alloy C-276 is defined in Table 1 of AWS A5.14/A5.14M: 2018 (Specification for Nickel and Nickel-Alloy bare Welding Electrodes and rods), entitled "Chemical composition requirements for Nickel and Nickel-Alloy Electrodes and Rods" under the AWS classification reference ERNiCrMo-4 (number UNS N10276).

The alloy C-4 is defined in Table 1 of the standard AWS A5.14/A5.14M:2018 (Specification for Nickel and Nickel-Alloy bare Welding Electrodes and Rods), entitled "Chemical composition requirements for Nickel and Nickel-Alloy Electrodes and Rods" under the AWS classification reference ERNiCrMo-7 (number UNS N06455).

The alloy 22 is defined in Table 1 of AWS A5.14/A5.14M: 2018 (Specification for Nickel and Nickel-Alloy bare Welding Electrodes and rods), entitled "Chemical composition requirements for Nickel and Nickel-Alloy Electrodes and Rods" under the AWS classification reference ERNiCrMo-10 (number UNS N06022).

The parts or portions of parts are in particular tube sections, tubes and/or metal sheets or parts of metal sheets made of the base material.

For example the filler wire is also intended for being used as a filler wire in a metal additive manufacturing process.

The additive manufacturing process is for example an additive manufacturing process using an electric arc, a laser beam and/or an electron beam as an energy source for melting the filler wire.

The additive manufacturing process is in particular a Directed Energy Deposition additive manufacturing process. During such process, the filler material is deposited, in particular via a nozzle, and immediately melted by a concentrated thermal energy, in particular a laser beam, an electron beam and/or an electric arc.

As an example, the additive manufacturing process is a wire-arc (WAAM or "Wire Arc Additive Manufacturing"), wire-laser, electron beam-wire ("Electron Beam Free Form Fabrication" or "Electron beam additive manufacturing") process, or a hybrid additive manufacturing process combining wire-arc and laser-powder technologies or wire-arc and wire-laser technologies.

In the case of a hybrid wire-arc and laser-powder process, the powder used has the same composition as the wire.

Such a powder, the particle size distribution of which after screening is between 20 μm and 150 μm, is for example obtained from the filler wire according to the invention, by means of a plasma atomization technology. Preferably, the filler wire used for manufacturing the powder has a diameter of about 3 mm.

The particle size distribution of the powders is determined in particular by the following measurement method. The powder batches are separated into a plurality of powder size distributions, by means of ultrasonic vibration stainless steel screens. The analysis of the size distribution of powders resulting from screening is carried as per the ASTM B214-07 standard. Screening is used for obtaining 5 size classes: <20 μm-20 μm to 45 μm-45 μm to 75 μm-75 μm to 105 μm→105 μm.

The plasma atomization technology for manufacturing a powder from a wire is known per se, and is thus not described in more detail.

The parts or portions of parts are intended in particular for the aeronautical, transport or energy market. The parts or portions of parts form for example casings, frames, tubes with complex shapes, valves, attachment lugs, or portions of parts having particular functions. As an example, such a portion of a part forms a heat exchanger element comprising for example channels for the circulation of a fluid formed by additive manufacturing on a support part, the support part being made for example of a material different from the material of the heat exchanger element.

The invention further relates to a method for manufacturing a filler wire made of the alloy as described hereinabove.

The method comprises, in a first step, the supply of a semi-finished product made of said alloy. To this end, the alloy is either cast into ingots or directly cast into billets, in particular by means of continuous casting, in particular rotary casting. The semi-finished products obtained at the end of such step are thus advantageously ingots or billets, and have for example a diameter comprised between 130 and 230 mm, and more particularly equal to approximately 150 mm.

The semi-finished products are then transformed by hot transformation so as to form an intermediate wire.

In particular, during the hot transformation step, the semi-finished products, i.e. in particular the ingots or billets, are heated, in particular in a gas furnace, to a temperature comprised between 1180° C. and 1220° C.

They are then subject to hot roughing in order to reduce the cross-section thereof, for example by imparting to the semi-finished products a square cross-section with a side of about 100 mm to 200 mm. A semi-finished product with reduced cross-section is thereby obtained. The length of the semi-finished product with reduced cross-section is comprised in particular between 10 meters and 20 meters.

The semi-finished products with reduced cross-section are then again subject to a hot transformation, at a temperature comprised between 105° and 1150° C., in order to obtain the intermediate wire. The intermediate wire can be, in particular, a machine wire. The wire has for example a diameter comprised between 5 mm and 21 mm, and in particular approximately equal to 5.5 mm. Advantageously, during such step, the intermediate wire is produced by hot rolling on a wire mill train.

Optionally, the intermediate wire is then subject to hyper-quenching in a pool, after a heat treatment in a gas furnace, at a temperature comprised between 1150° C. and 1220° C. for a length of time comprised between 60 minutes and 120 minutes.

The intermediate wire is then pickled and then wound into a coil.

Optionally, in order to obtain the filler wire, the intermediate wire thus obtained is drawn by means of a wire drawing installation of known type. The filler wire has a diameter smaller than the diameter of the starting wire. The diameter thereof is in particular comprised between 0.5 mm and 3.5 mm. The diameter thereof is advantageously comprised between 0.8 mm and 2.4 mm.

The wire drawing step comprises, depending on the final diameter to be reached, one or a plurality of wire drawing passes, preferably with annealing between two successive wire drawing passes. The annealing is carried out for example while passing under a reducing atmosphere at a temperature of the order of 1150° C.

The wire drawing step is preferably followed by cleaning the surface of the drawn wire and then winding the wire.

The wire drawing passes are cold passes.

Any other methods of manufacturing the alloy according to the invention and of manufacturing finished products made of the alloy known to a person skilled in the art, can be used for this purpose.

The invention further relates to a welded assembly 1 comprising at least two portions of parts 3, made of a base metal, joined together by a weld bead 5 obtained from the filler wire as described hereinabove. The above-described welded assembly is shown schematically in FIG. 1.

The degree of dilution of the wire during welding is comprised for example between 1% and 10%, and in particular approximately equal to 5%.

Throughout the text, "portions of parts" welded together, refer both to the case where the parts welded together belong to two initially separated parts and to the case where the parts are two parts of the same part folded over itself, for example the two longitudinal edges of a sheet metal which is welded to form a tube.

The base metal is in particular a carbon steel, such as a X56, X60, X65 or X70 steel or an iron-nickel alloy such as Fe-9% Ni, i.e. having a nickel content comprised between 5 and 10% by weight, or a nickel alloy such as C-276, C-4 or 22.

The invention further relates to a welding method for welding together at least two portions of parts 3, made of the base metal defined hereinabove so as to produce a welded assembly 5 as illustrated in FIG. 1.

In a first step, a filler wire as described hereinabove is provided. Portions of parts 12 made of the base metal to be welded together by the welding process are also provided.

The portions of parts 12 are then welded together using the filler wire as welding filler wire. During such step, butt welding is preferably carried out.

The welding step can comprise one or a plurality of welding passes. Conventionally, the welding step comprises a first welding pass called the root pass, followed by one or a plurality of additional welding passes, called filling passes. All the welding passes are carried out by using as filler wire the filler wire according to the invention, as described hereinabove. The dilution of the filler wire is thus limited to dilution by the molten base metal resulting from the welding.

The degree of dilution of the wire during welding is comprised for example between 1% and 10%, and in particular approximately equal to 5%.

Welding is performed for example by arc welding, for example by plasma welding with filler wire, by MIG (Metal Inert Gas) welding or by MIG/MAG (Metal Active Gas) welding.

According to one embodiment, shown in FIG. 2, the welded assembly 1 is a tube section 7 comprising a sheet metal 9 folded in the form of a tube, the longitudinal edges 12 of which are joined together by a weld bead 15 obtained from the filler wire as defined hereinabove. In such case, the portions of parts 3 comprise the longitudinal edges 12 of the sheet metal 9.

The wall of the tube section 5 has for example a thickness comprised between 3 mm and 60 mm.

The tube section 5 is intended in particular for transporting corrosive products, more particularly gas or oil. More particularly, it is intended to form a part of a pipeline, in particular laid on the seabed, and more particularly at a depth going as deep as 3,000 m.

Figure 3:
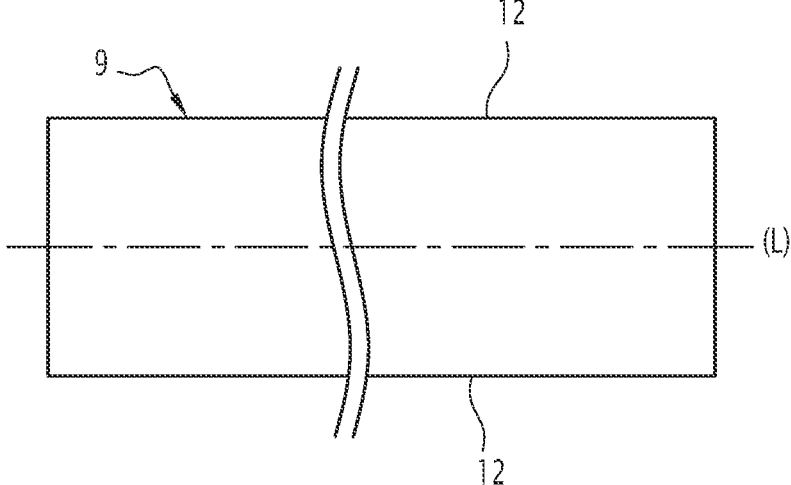
FIG. 3 is a schematic top view of a sheet metal used when implementing the process for manufacturing a tube section.

A further subject matter of the invention is a manufacturing method for such a tube section 5. The method comprises providing a sheet metal 9 made of the base metal. Such a sheet metal 9 is shown in FIG. 3. The sheet metal 9 extends along a longitudinal direction L and has longitudinal edges 12 substantially parallel to the longitudinal direction L. For example, the sheet metal has a thickness comprised between 3 mm and 60 mm.

The method further comprises a step consisting in folding the sheet metal 9 so as to bring the two longitudinal edges 12 facing each other, followed by a step consisting in welding the two longitudinal edges 12 facing each other using the welding method defined hereinabove. In such case, the portions of parts 3 described in the context of the welding process comprise the longitudinal edges 12 of the sheet metal 9.

The weld produced during such step is a longitudinal weld. Preferably, the weld is a butt weld.

Figure 2:
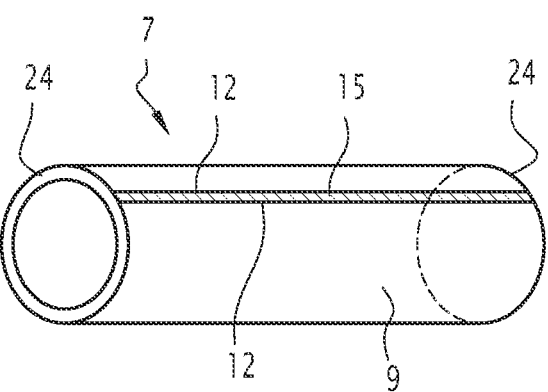
FIG. 2 is a schematic perspective view of a tube section according to the invention.

At the end of such process, a tube section 7 is obtained, as illustrated in FIG. 2, wherein the sheet metal 9 is folded into the shape of a tube, and the longitudinal edges 12 of the sheet metal 9 are joined together by a weld bead 15 obtained from the filler wire as defined hereinabove.

Figure 4:
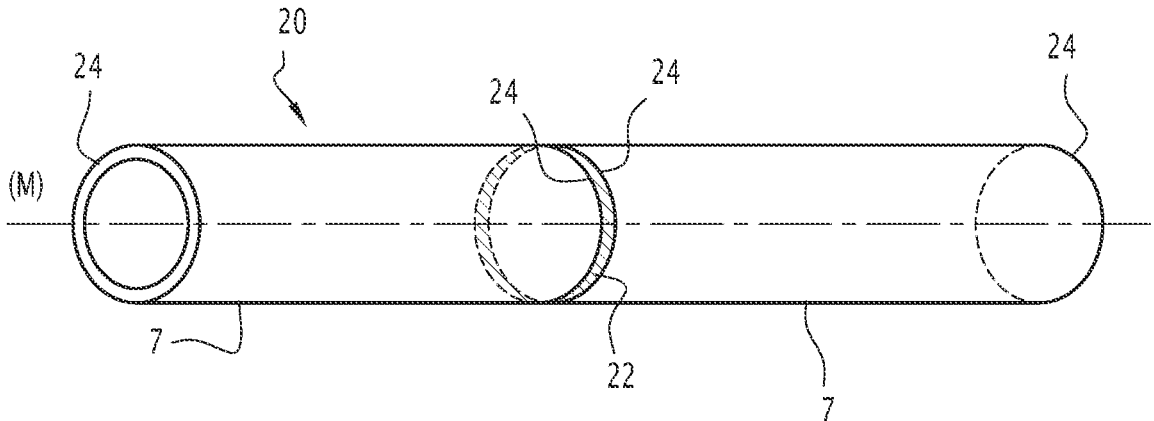
FIG. 4 is a schematic perspective view of a tube according to the invention.

According to another embodiment, shown in FIG. 4, the welded assembly is a tube 20 and the portions of parts 3 are tube sections 7 connected together by a weld bead 22 obtained from the filler wire as defined hereinabove. In such embodiment, the weld bead 22 extends along the circumference of the tube 20 so as to link the tube sections 7 together.

The weld is in particular a butt weld, preferably an orbital weld. Orbital welding refers to a weld produced by rotating the welding tool, namely more particularly the welding torches, with respect to the tube sections 7 to be welded.

The wall 20 has for example a thickness comprised between 3 mm and 60 mm.

According to one embodiment, the tube sections 7 are tube sections as described hereinabove.

According to a variant, the portions of parts 3 are tube sections not comprising any longitudinal weld, and obtained for example by billet extrusion.

The tube 20 is intended in particular for transporting corrosive products, more particularly gas or oil. More particularly, it is intended to form a part of a pipeline, in particular laid on the seabed, and more particularly at a depth going as deep as 3,000 m.

Thereby, the further subject matter of the invention is a manufacturing method for a tube 20 as defined hereinabove.

During such process, at least two tube sections 7 are provided. Each tube section 5 is substantially cylindrical, has an axis M and two longitudinal ends 24 spaced apart along the direction of the axis M.

The two tube sections 7 are then positioned in such a way that the longitudinal ends 24 thereof are arranged facing each other along the direction of the axis M of the tube sections, the longitudinal ends 24 facing the two tube sections 7 are then welded together by means of the welding method as defined hereinabove. In such case, the portions of parts 3 defined in the context of the welding process comprise the longitudinal ends 24 of the tube sections 7.

Advantageously, during such step, a butt weld is produced between the longitudinal ends 24 facing the tube sections 7. The weld is preferably an orbital weld.

Preferably, the welding step comprises, prior to the joining together of the tube sections 7, a step of machining chamfers at the ends 24 of the tube sections 7 to be welded together.

The welding step is carried out a number of times equal to the number of tube sections 7 to be welded to form the tube 20, minus one.

According to one embodiment, the tube sections 7 are tube sections 7 as described hereinabove.

In a variant, the method can be carried out with any type of tube section the longitudinal ends of which are made of the base metal, whatever the method of obtaining the tube section. More particularly, the method is carried out on tube sections which do not comprise a longitudinal weld, and which are obtained more particularly by billet extrusion.

The method is more particularly carried out on a barge, the barge being for example situated at the place where the tube 20 is installed.

At the end of the welding step(s), the tube 20 is obtained. The tube 20 comprises at least two successive tube sections 7 assembled together by a weld bead 22 produced from the filler wire as defined hereinabove.

Figure 5:
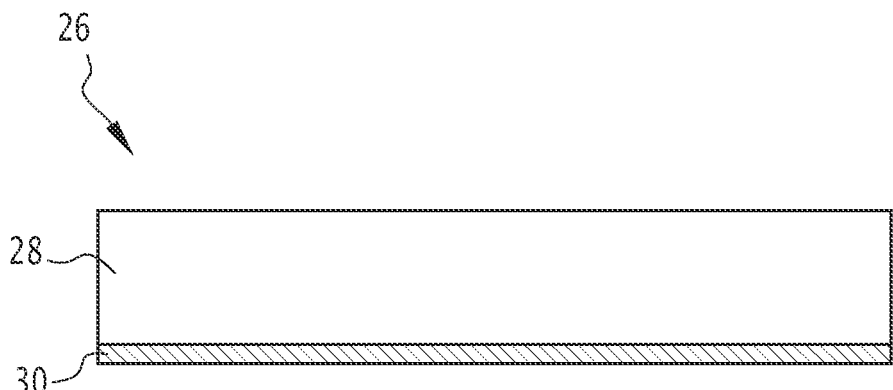
FIG. 5 is a schematic perspective view of a part coated according to the invention.

The invention further relates to a coated part 26 as shown in FIG. 5 comprising a substrate 28 made of a base material coated with a coating 30 made of an alloy as described hereinabove. The base material is a metallic material.

The base material is in particular a carbon steel. Preferably, the base material is a X56, X60 or X65 or X70 steel.

The coating 30 is more particularly applied to the substrate 28 by a process of hardsurfacing by welding by means of a filler wire having the composition described hereinabove.

The coating 30 has more particularly a thickness comprised between 2 mm and 20 mm.

Such a coating 30 improves the resistance to corrosion of the coated part 26, more particularly in the presence of corrosive products, such as petroleum products.

The coated part 26 is in particular a coated tube section 7, the coating 30 being formed on the inner wall of the tube section 7, and covering in particular the inner wall of the tube section 7 over the entire surface thereof, including the weld bead 12 if any.

The invention further relates to a method for producing a coated part 26 as described hereinabove, comprising the provision of a substrate 28 made of the base material, followed by the application of a coating 30 on a surface of the substrate by a welding hardsurfacing process using a filler wire having the composition described hereinabove.

In the case where the coated part 26 is a section of coated tube 7, the manufacturing method comprises more particularly a step of manufacturing a tube section 7 by implementing the method described hereinabove, followed by a step of applying a coating 30 to an inner surface of the tube section 7 by a process of hardsurfacing by welding using a filler wire having the composition described hereinabove.

The coating 30 improves the resistance to corrosion of the tube section 7, for example during the transport of variably corrosive petroleum products.

According to a particular embodiment, the tube 20 described hereinabove comprises two tube sections 7 coated with a coating 30 as described hereinabove, joined together by a weld bead 22.

Figure 6:
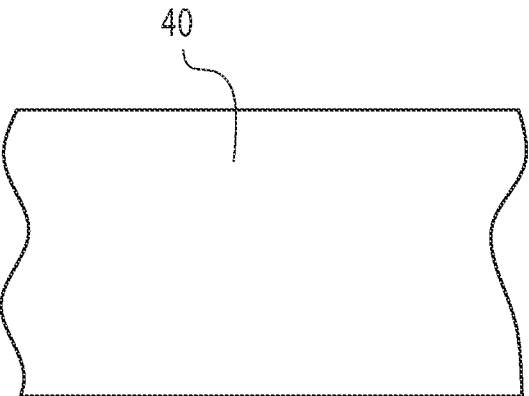
FIG. 6 is a schematic perspective view of a part produced by additive manufacturing according to the invention.

The invention further relates to a method for manufacturing a part 40 as shown schematically in FIG. 6, made of an alloy as described hereinabove, comprising:

the supply of a filler wire made of the alloy; and the manufacture of the part 40 by a metallic additive manufacturing process using, as filler material, a filler wire made of the alloy as described hereinabove and/or a powder made of the alloy as described hereinabove.

The additive manufacturing process is for example an additive manufacturing process using an electric arc, a laser beam and/or an electron beam as an energy source for melting the filler material.

The additive manufacturing process is in particular a Directed Energy Deposition additive manufacturing process. During such process, the filler material is deposited, in particular via a nozzle, and immediately melted by a concentrated thermal energy, in particular a laser beam, an electron beam and/or an electric arc.

As an example, the additive manufacturing process is a wire-arc, wire-laser, electron beam-wire ("Electron Beam Free Form Fabrication") process or a hybrid additive manufacturing process combining wire-arc and laser-powder technologies or wire-arc and wire-laser.

In the case where a hybrid additive manufacturing process combining wire-arc and laser-powder technologies or wire-arc and wire-laser technologies is used, the powder and the filler wire are made from the alloy as described hereinabove.

The additive manufacturing processes mentioned hereinabove are known per se and are thus not described in detail.

In the case where the filler material comprises a powder, in particular in the context of the hybrid wire-arc and laser-powder process, the process further comprises, prior to the manufacture of the part 40, a step of supplying a powder made of the alloy as described hereinabove. The powder, the particle size distribution of which after screening is between 20 μm and 150 μm, is for example manufactured by plasma atomization from a wire made of an alloy as described hereinabove, the wire having more particularly a diameter of about 3 mm.

The plasma atomization process is known per se, and is thus not described in detail.

The invention also relates to a part 40 or portion of a part made of an alloy as described hereinabove, produced by metal additive manufacturing.

The metal additive manufacturing process uses more particularly, as filler material, a filler wire made of the alloy as described hereinabove and/or a powder made of the alloy as described hereinabove.

The additive manufacturing process is for example an additive manufacturing process using an electric arc, a laser beam and/or an electron beam as an energy source for melting the filler material.

The additive manufacturing process is in particular a Directed Energy Deposition additive manufacturing process. During such process, the filler material is deposited, in particular via a nozzle, and immediately melted by a concentrated thermal energy, in particular a laser beam, an electron beam and/or an electric arc.

As an example, the additive manufacturing process is a wire-arc, wire-laser, electron beam-wire ("Electron Beam Free Form Fabrication") process or a hybrid additive manufacturing process combining wire-arc and laser-powder technologies or wire-arc and wire-laser.

In the case where a hybrid additive manufacturing process combining wire-arc and laser-powder technologies or wire-arc and wire-laser technologies is used, the powder and the filler wire are made from the alloy as described hereinabove.

A part or portion of a part obtained by a metal additive manufacturing process, such as the part 40, is as-solidified. The part or portion of a part thus has a solidification microstructure typical of the nickel alloy considered, such a microstructure typically comprising columnar dendrites which grow epitaxially on top of each other and the orientation of which depends on the width and the of the produced metal wall. Moreover, a part obtained by an additive manufacturing process has, because of the additive manufacturing process thereof, a succession of superposed solidification strata. Each stratum, obtained by solidification of deposited drops of molten metal, melts the skin of the preceding stratum in order to generate metallurgical continuity, and consequently heats the rest of the lower strata. The reheating temperature is all the lower as the stratum in question is far from the zone undergoing melting and solidification. Such particular microstructure can be observed by metallographic observation on metallographic sections of the parts.

A part 40 or portion of a part produced by a metal additive manufacturing process can thus be distinguished from parts produced by other methods, and in particular from a part produced by conventional metallurgy which produces a recrystallized structure with homogeneous grains.

The parts 40 or portions of parts are intended in particular for the aeronautical, transport or energy market. The parts or portions of parts form for example casings, frames, tubes with complex shapes, valves, attachment lugs, or portions of parts having particular functions. As an example, such a portion of a part forms a heat exchanger element comprising for example channels for the circulation of a fluid formed by additive manufacturing on a support part, the support part being made for example of a material different from the material of the heat exchanger element.

Tests

In a first series of tests, the inventors carried out laboratory castings for producing ingots of alloys having compositions as defined hereinabove, as well as comparative alloys having compositions different from the composition described hereinabove.

The alloys were produced under vacuum, and the ingots thus produced were transformed by hot rolling in order to obtain sheet bars with dimensions 10×50×300 mm.

The alloy compositions of each of the sheet bars tested are shown in Table 1 below.

The inventors then carried out the following tests on the sheet bars thus produced.

On some of the sheet bars, the inventors produced joining fusion lines, front and back, by means of a TIG torch, in order to develop solidification structures in the thickness of the sheet bars comparable to the structures produced by TIG or MIG welding, under non-dilution condition, and sampled, tensile and resilience test specimens from the molten areas.

The inventors then carried out:

mechanical flat tensile testing at room temperature (20° C.) for measuring the yield strength at 0.2% elongation $Rp_{0.2}$ at 20° C. on the tensile specimens described hereinabove, as per the standard NF EN ISO 6892-1 (December 2019). The results of the tests are summarized in the "$Rp_{0.2}$" column in Table 2 hereinafter.

resilience tests at room temperature (20° C.) on the resilience test specimens described hereinabove, along with measurement of the impact fracture energy (denoted KCV), as per the standard NF EN ISO 148-1 (January 2011). The fracture energy is expressed in J/cm2. The fracture energy reflects the resilience of the part. The results of the tests are summarized in the "KCV" column in Table 2 hereinafter.

The inventors also measured, in the molten zones of the sheet bars, the surface fraction of phases precipitated during the solidification of the molten metal under the passage of the TIG torch. The surface fraction of precipitated phases is determined by image analysis on images of the sheet bars, obtained with a scanning electron microscope (SEM). Indeed, the precipitated phases correspond to the white areas on the images, and are detected by an image processing software, which detects the white areas by means of a gray scale analysis and then determines the surface fraction occupied by the white areas. The results of the measurements are summarized in "FS" column in Table 2 hereinafter.

The inventors also carried out, on sheet bars not subject to joining fusion lines, Varestraint tests as per the European standard FD CEN ISO/TR 17641-3 (November 2005) under 3.2% plastic deformation, in order to evaluate the resistance thereof to hot cracking, along with a measurement of the total length of cracks developed during testing. The results of the testing are summarized in the "$L_{total}$ Cracks" in Table 2 below.

Finally, the inventors carried out potentiometric tests to test the resistance of the alloys to localized corrosion. To this end, the inventors measured the pitting potential V in LiCl medium at 11.9 mol·l$^{-1}$ at a pH of 5.4 and at a temperature of 30° C. and compared the pitting potential with the pitting potential of Inconel® 625 ($V_{Inconel\ 625/SCE}$<120 mV), where SCE is a reference potential with respect to the saturated calomel electrode.

In Tables 1 and 2 below, the tests which are not according to the invention are underlined.

TABLE 1

| | Composition of the alloys of the first series of tests | | | | | | | | |
|---|---|---|---|---|---|---|---|---|---|
| Test | Cr (% wt) | Mo (% wt) | W (% wt) | Ti + Ta (% wt) | Fe (% wt) | Si (% wt) | Mn (% wt) | C (% wt) | S (% wt) |
| 1 | 16.8 | 11.6 | 3.5 | 0.78 | 0.30 | 0.41 | 0.024 | 0.012 | 0.0005 |
| 2 | 16.7 | 12.5 | 5.9 | 0.76 | 0.30 | 0.39 | 0.025 | 0.012 | 0.0006 |
| 3 | 17.0 | 13.7 | 3.5 | 0.72 | 0.30 | 0.41 | 0.025 | 0.011 | 0.0007 |
| 4 | 17.3 | 17.0 | 3.5 | 0.76 | 0.30 | 0.40 | 0.024 | 0.011 | 0.0007 |
| 5 | 17.0 | 18.6 | 3.6 | 0.78 | 0.30 | 0.40 | 0.025 | 0.013 | 0.0006 |
| 6 | 16.8 | 16.8 | 3.5 | 0.78 | 3.53 | 0.40 | 0.025 | 0.012 | 0.0006 |
| 7 | 17.6 | 10.6 | 3.9 | 0.55 | 0.33 | 0.37 | 0.028 | 0.011 | 0.0007 |
| 8 | 18.2 | 12.4 | 3.9 | 0.57 | 0.32 | 0.37 | 0.028 | 0.010 | 0.0007 |
| 9 | 18.2 | 12.3 | 6.0 | 0.54 | 0.34 | 0.40 | 0.027 | 0.010 | 0.0005 |
| 10 | 17.8 | 16.3 | 3.0 | 0.54 | 0.33 | 0.38 | 0.029 | 0.011 | 0.0005 |
| 11 | 17.8 | 17.3 | 3.0 | 0.55 | 0.32 | 0.39 | 0.028 | 0.010 | 0.0006 |
| 12 | 17.9 | 19.3 | 3.0 | 0.57 | 0.33 | 0.39 | 0.027 | 0.013 | 0.0007 |
| 13 | 17.8 | 17.8 | 3.0 | 0.56 | 3.00 | 0.37 | 0.029 | 0.010 | 0.0007 |
| 14 | 19.7 | 12.3 | 3.0 | 0.30 | 0.35 | 0.43 | 0.031 | 0.008 | 0.0005 |
| 15 | 19.6 | 13.1 | 5.1 | 0.29 | 0.35 | 0.46 | 0.031 | 0.009 | 0.0006 |
| 16 | 19.7 | 16.3 | 3.0 | 0.29 | 0.34 | 0.44 | 0.029 | 0.010 | 0.0005 |
| 17 | 20.3 | 16.8 | 3.0 | 0.30 | 1.47 | 0.43 | 0.030 | 0.008 | 0.0005 |
| 18 | 22.4 | 8.6 | 3.9 | 0.49 | 0.25 | 0.52 | 0.022 | 0.014 | 0.0005 |
| 19 | 22.3 | 12.4 | 3.0 | 0.48 | 0.25 | 0.48 | 0.021 | 0.014 | 0.0006 |
| 20 | 22.1 | 12.5 | 4.1 | 0.48 | 0.25 | 0.52 | 0.022 | 0.015 | 0.0005 |
| 21 | 22.4 | 15.2 | 3.0 | 0.50 | 0.25 | 0.51 | 0.023 | 0.016 | 0.0006 |
| 22 | 22.3 | 17.4 | 3.0 | 0.52 | 0.25 | 0.49 | 0.021 | 0.015 | 0.0007 |
| 23 | 22.1 | 15.0 | 3.0 | 0.49 | 2.95 | 0.48 | 0.023 | 0.015 | 0.0007 |
| 24 | 24.2 | 8.1 | 2.5 | 0.65 | 0.40 | 0.48 | 0.023 | 0.010 | 0.0006 |
| 25 | 24.0 | 11.0 | 2.5 | 0.67 | 0.41 | 0.49 | 0.023 | 0.010 | 0.0005 |
| 26 | 23.8 | 14.5 | 2.5 | 0.63 | 0.40 | 0.48 | 0.023 | 0.011 | 0.0005 |
| 27 | 23.7 | 16.3 | 2.5 | 0.67 | 0.39 | 0.47 | 0.024 | 0.011 | 0.0006 |
| 28 | 23.9 | 14.6 | 2.5 | 0.65 | 2.53 | 0.51 | 0.023 | 0.010 | 0.0006 |

In the alloys of Table 1, the Al content is between 0.01 and 0.35%, the N content is comprised between 0.001 and 0.05%, the Mg and Ca contents are less than or equal to 0.005%, and the P content is less than or equal to 0.005%. Moreover, the alloy does not contain niobium.

For all alloys in Table 1, the rest is nickel, as well as impurities resulting from the manufacturing. Moreover, all the compositions are indicated as percentage by weight.

TABLE 2

| | Results of the tests carried out on the sheet bars produced from the alloys of Table 1 | | | | | |
|---|---|---|---|---|---|---|
| Test | Mo + W ≥ -0.5(Cr + Fe) + 25? | Mo + W ≤ -0.5(Cr + Fe) + 30? | Rp0.2% (MPa) | KCV (J/cm$^2$) | $L_{Total}$ Cracks (mm) | Fs (%) |
| A1 | No | Yes | 497 | 217 | 15 | 1.1 |
| A2 | Yes | Yes | 502 | 142 | 18 | 1.5 |
| A3 | Yes | Yes | 550 | 179 | 17 | 1.4 |
| A4 | Yes | Yes | 553 | 104 | 19 | 1.5 |
| A5 | Yes | No | 611 | 64 | 22 | 1.9 |
| A6 | Yes | No | 588 | 83 | 22 | 1.7 |
| A7 | No | Yes | 493 | 226 | 13 | 0.9 |
| A8 | Yes | Yes | 513 | 182 | 15 | 1.3 |
| A9 | Yes | Yes | 536 | 130 | 17 | 1.4 |
| A10 | Yes | Yes | 545 | 120 | 17 | 1.5 |
| A11 | Yes | Yes | 570 | 100 | 19 | 1.5 |
| A12 | Yes | No | 602 | 55 | 22 | 1.8 |
| A13 | Yes | No | 562 | 75 | 22 | 1.7 |
| A14 | Yes | Yes | 503 | 172 | 14 | 1.1 |
| A15 | Yes | Yes | 520 | 125 | 16 | 1.3 |
| A16 | Yes | Yes | 569 | 100 | 18 | 1.5 |
| A17 | Yes | No | 571 | 93 | 21 | 1.6 |
| A18 | No | Yes | 474 | 219 | 14 | 1.0 |
| A19 | Yes | Yes | 538 | 159 | 16 | 1.4 |
| A20 | Yes | Yes | 527 | 148 | 17 | 1.5 |
| A21 | Yes | Yes | 599 | 116 | 18 | 1.5 |
| A22 | Yes | No | 623 | 62 | 22 | 1.8 |
| A23 | Yes | No | 587 | 89 | 22 | 1.6 |
| A24 | No | Yes | 483 | 257 | 14 | 1.1 |
| A25 | Yes | Yes | 516 | 190 | 17 | 1.3 |
| A26 | Yes | Yes | 590 | 115 | 19 | 1.5 |
| A27 | Yes | No | 609 | 78 | 21 | 1.9 |
| A28 | Yes | No | 601 | 95 | 21 | 1.8 |

Moreover, during potentiometric tests, the alloys A1 to A28 of Table 1 developed a pitting potential V with respect to the reference potential with respect to the saturated calomel electrode greater than or equal to 150 mV. The alloys thus have a better resistance to localized corrosion than the Inconel® 625 alloy.

As indicated hereinabove, the following properties are preferably sought, in combination:

a yield strength $Rp_{0.2}$ greater than or equal to 500 MPa;

KCV resilience greater than or equal to 100 J/cm$^2$;

a total length of cracks less than or equal to 20 mm;

a surface fraction of precipitated phases FS less than or equal to 1.5%;

a resistance to localized corrosion greater than or equal to the resistance of Inconel® 625 alloy.

Among the above parameters, the total crack length is representative of the weldability of the alloy. Since the total crack length for Inconel® 625 alloy is equal to 20 mm, a total crack length of less than or equal to 20 mm corresponds to a weldability greater than or equal to the weldability of Inconel® 625 alloy and is thus satisfactory for the applications considered.

Such properties are obtained in the case of examples A2 to A4, A8 to A11, A14 to A16, A19 to A21, A25 and A26, which correspond to alloys having the composition as described hereinabove.

On the other hand, the yield strength $Rp_{0.2}$ is less than or equal to 500 MPa in the case of the comparative examples A1, A7, A18, A24, while the KCV resilience is insufficient and/or the crack length is too high in the case of the comparative examples A5, A6, A12, A13, A17, A22, A23, A27, A28. It is noted that, in the context of the counter-examples, the relation −0.5×(Cr+Fe)+25%≤Mo+W≤−0.5× (Cr+Fe)+30% is not satisfied.

Moreover, as shown by the comparative examples A6, A13, A17, A23 and A28, alloys containing iron at a content greater than 1.0% exhibit degraded ductility, and increased sensitivity to hot cracking.

In general, the inventors have found that a surface fraction of precipitated phases FS greater than 1.5% results in a KCV resilience of less than 100 J/cm$^2$ and/or a crack length of greater than 20 mm.

The inventors also carried out a second series of tests, under the same conditions as mentioned with regard to the first series of tests, but with sheet bars made of alloys having the compositions summarized in Table 3. Moreover, the results of the tests carried out on the sheet bars are indicated in Table 4.

TABLE 3

Composition of the alloys of the second series of tests

| Test | Cr (% wt) | Mo (% wt) | W (% wt) | Ti + Ta (% wt) | Fe (% wt) | Si (% wt) | Mn (% wt) | C (% wt) | S (% wt) | Y (% wt) | Ce + La (% wt) |
|---|---|---|---|---|---|---|---|---|---|---|---|
| B1 | 16.8 | 11.7 | 3.5 | 0.73 | 0.30 | 0.17 | 0.025 | 0.012 | 0.0004 | 0.0015 | — |
| B2 | 17.2 | 12.5 | 6.0 | 0.76 | 0.30 | 0.16 | 0.026 | 0.013 | 0.0005 | 0.0013 | — |
| B3 | 16.9 | 13.5 | 3.5 | 0.77 | 0.29 | 0.17 | 0.025 | 0.012 | 0.0004 | 0.0013 | — |
| B4 | 16.9 | 17.0 | 3.5 | 0.75 | 0.30 | 0.16 | 0.024 | 0.012 | 0.0004 | 0.0015 | — |
| B5 | 17.0 | 19.0 | 3.6 | 0.75 | 0.29 | 0.17 | 0.024 | 0.012 | 0.0004 | 0.0016 | — |
| B6 | 16.8 | 17.1 | 3.6 | 0.75 | 3.47 | 0.15 | 0.026 | 0.012 | 0.0004 | 0.0015 | — |
| B7 | 17.8 | 10.4 | 4.1 | 0.56 | 0.33 | 0.14 | 0.029 | 0.010 | 0.0005 | — | 0.0020 |
| B8 | 18.0 | 12.5 | 4.1 | 0.57 | 0.33 | 0.12 | 0.027 | 0.010 | 0.0005 | — | 0.0020 |
| B9 | 17.7 | 12.6 | 6.0 | 0.55 | 0.34 | 0.13 | 0.027 | 0.010 | 0.0004 | — | 0.0023 |
| B10 | 17.8 | 16.3 | 3.0 | 0.53 | 0.33 | 0.11 | 0.028 | 0.010 | 0.0004 | — | 0.0023 |
| B11 | 17.8 | 17.7 | 3.0 | 0.58 | 0.33 | 0.14 | 0.028 | 0.010 | 0.0006 | — | 0.0025 |
| B12 | 18.3 | 19.5 | 3.0 | 0.55 | 0.33 | 0.13 | 0.029 | 0.010 | 0.0005 | — | 0.0025 |
| B13 | 17.9 | 17.7 | 3.0 | 0.57 | 2.97 | 0.12 | 0.027 | 0.010 | 0.0005 | — | 0.0025 |
| B14 | 19.9 | 12.6 | 3.0 | 0.30 | 0.35 | 0.18 | 0.030 | 0.008 | 0.0010 | 0.0015 | 0.0014 |
| B15 | 20.3 | 13.1 | 5.0 | 0.29 | 0.36 | 0.22 | 0.031 | 0.008 | 0.0011 | 0.0015 | 0.0015 |
| B16 | 19.8 | 16.2 | 3.0 | 0.31 | 0.35 | 0.20 | 0.029 | 0.008 | 0.0010 | 0.0013 | 0.0014 |
| B17 | 19.7 | 16.4 | 3.5 | 0.31 | 1.48 | 0.20 | 0.030 | 0.008 | 0.0010 | 0.0012 | 0.0015 |
| B18 | 22.1 | 8.6 | 4.0 | 0.51 | 0.25 | 0.13 | 0.023 | 0.015 | 0.0018 | — | 0.0070 |
| B19 | 21.8 | 12.7 | 3.0 | 0.52 | 0.25 | 0.16 | 0.022 | 0.015 | 0.0017 | — | 0.0070 |
| B20 | 21.9 | 12.5 | 4.0 | 0.49 | 0.25 | 0.15 | 0.022 | 0.014 | 0.0017 | — | 0.0075 |
| B21 | 22.1 | 15.1 | 3.0 | 0.52 | 0.25 | 0.14 | 0.023 | 0.015 | 0.0019 | — | 0.0073 |
| B22 | 22.1 | 17.3 | 2.9 | 0.48 | 0.25 | 0.14 | 0.023 | 0.015 | 0.0017 | — | 0.0074 |
| B23 | 22.3 | 14.8 | 3.0 | 0.51 | 3.01 | 0.15 | 0.022 | 0.015 | 0.0017 | — | 0.0074 |
| B24 | 24.1 | 7.8 | 2.5 | 0.66 | 0.39 | 0.15 | 0.024 | 0.010 | 0.0014 | 0.0053 | — |
| B25 | 23.9 | 10.9 | 2.5 | 0.65 | 0.40 | 0.15 | 0.024 | 0.010 | 0.0015 | 0.0053 | — |
| B26 | 24.0 | 14.6 | 2.5 | 0.62 | 0.40 | 0.14 | 0.025 | 0.011 | 0.0015 | 0.0055 | — |
| B27 | 24.2 | 16.3 | 2.9 | 0.68 | 0.40 | 0.14 | 0.024 | 0.011 | 0.0014 | 0.0050 | — |
| B28 | 23.6 | 14.5 | 3.0 | 0.62 | 2.53 | 0.14 | 0.025 | 0.010 | 0.0015 | 0.0050 | — |

In the alloys of Table 3, the Al content is between 0.01 and 0.35%, the N content is comprised between 0.001 and 0.05%, the Mg and Ca contents are less than or equal to 0.005%, and the P content is less than or equal to 0.005%. Moreover, the alloy does not contain niobium.

For all alloys in Table 3, the rest is nickel, as well as impurities resulting from the manufacturing. Moreover, all the compositions are indicated as percentage by weight.

TABLE 4

Results of the tests carried out on the sheet bars produced from the alloys of Table 3

| Test | Mo + W ≥ −0.5(Cr + Fe) + 25? | Mo + W ≤ −0.5(Cr + Fe) + 30? | Rp0.2% (MPa) | KCV (J/cm²) | L$_{Total}$ Cracks (mm) | Fs (%) |
|---|---|---|---|---|---|---|
| B1 | No | Yes | 495 | 210 | 12 | 1.0 |
| B2 | Yes | Yes | 517 | 144 | 15 | 1.4 |
| B3 | Yes | Yes | 545 | 179 | 15 | 1.4 |
| B4 | Yes | Yes | 607 | 101 | 16 | 1.5 |
| B5 | Yes | No | 610 | 65 | 21 | 1.7 |
| B6 | Yes | No | 595 | 75 | 21 | 1.8 |
| B7 | No | Yes | 491 | 216 | 13 | 0.9 |
| B8 | Yes | Yes | 519 | 170 | 12 | 1.3 |
| B9 | Yes | Yes | 500 | 139 | 16 | 1.3 |
| B10 | Yes | Yes | 555 | 112 | 16 | 1.5 |
| B11 | Yes | Yes | 590 | 105 | 18 | 1.5 |
| B12 | Yes | No | 624 | 58 | 21 | 1.6 |
| B13 | Yes | No | 590 | 75 | 21 | 1.8 |
| B14 | Yes | Yes | 531 | 177 | 12 | 1.2 |
| B15 | Yes | Yes | 518 | 126 | 13 | 1.2 |
| B16 | Yes | Yes | 587 | 100 | 13 | 1.5 |
| B17 | Yes | No | 553 | 88 | 21 | 1.9 |
| B18 | No | Yes | 478 | 232 | 13 | 1.1 |
| B19 | Yes | Yes | 536 | 164 | 15 | 1.4 |
| B20 | Yes | Yes | 515 | 148 | 16 | 1.4 |
| B21 | Yes | Yes | 563 | 110 | 15 | 1.5 |
| B22 | Yes | No | 591 | 67 | 21 | 1.7 |
| B23 | Yes | No | 563 | 96 | 21 | 1.8 |
| B24 | No | Yes | 490 | 251 | 13 | 1.0 |

TABLE 4-continued

| | | | | | $L_{Total}$ | |
| | Mo + W $\geq$ -0.5(Cr + Fe) + 25? | Mo + W $\leq$ -0.5(Cr + Fe) + 30? | Rp0.2% (MPa) | KCV (J/cm$^2$) | Cracks (mm) | Fs (%) |
| Test | | | | | | |
|---|---|---|---|---|---|---|
| B25 | Yes | Yes | 543 | 190 | 14 | 1.3 |
| B26 | Yes | Yes | 565 | 113 | 16 | 1.3 |
| B27 | Yes | No | 635 | 74 | 21 | 1.6 |
| B28 | Yes | No | 583 | 95 | 21 | 1.9 |

Moreover, during potentiometric tests, the alloys 1 to B28 of Table 3 developed a pitting potential V with respect to the reference potential with respect to the saturated calomel electrode greater than or equal to 150 mV. The alloys thus have a better resistance to localized corrosion than the Inconel® 625 alloy.

It is thus found that the desired properties in terms of yield strength, resilience, weldability, surface fraction of precipitated phases and resistance to localized corrosion are obtained in the case of examples B2 to B4, B8 to E11, B14 to B16, B19 to B21, B25 and B26, which correspond to alloys having the composition as described hereinabove.

The other results confirm the conclusions drawn from Table 2.

In particular, the yield strength $Rp_{0.2}$ is less than or equal to 500 MPa in the case of the comparative examples 1, B7, B18, B24, while the KCV resilience is insufficient in the case of the comparative examples B5, B6, B12, B13, B17, B22, B23, B27, B28. It is noted that, in the context of the counter-examples, the relation −0.5×(Cr+Fe)+25%≤Mo+W≤−0.5×(Cr+Fe)+30% is not satisfied.

Moreover, weldability and resilience are degraded if the alloy contains iron at a content greater than 1.0%.

Furthermore, by comparing the results of Tables 2 and 4, it can be seen that the addition of rare earths thus improves the resistance of the alloy to hot cracking.

The addition of rare earths is particularly advantageous when the base metal to be welded has higher sulfur and/or oxygen contents than the filler wire. Indeed, the inventors have found that rare earths contribute to the deoxidation and/or desulphurization of the molten puddle during the welding operation, and thus to the improvement of the resistance to hot cracking.

The alloy according to the invention has a yield strength $Rp_{0.2}$ greater than or equal to 500 MPa and a KCV resilience greater than or equal to 100 J/cm$^2$, which can be used for obtaining an overmatching of the mechanical properties with respect to a base metal with a yield strength $Rp_{0.2}$ lower than 500 MPa such as the alloys X56, X60, X65 and X70. Thus, the characteristics of the welds can be ignored for the design of welded assemblies made of such alloys as base materials.

Moreover, the alloy presents:

a resistance to corrosion greater than or equal to the resistance of the comparative Inconel® 625 alloy;

a weldability greater than or equal to the weldability of the comparative Inconel® 625 alloy.

Taking into account the properties thereof, the alloy according to the invention is thus particularly suitable for use as filler material for the manufacture of pipeline tubes intended for the transport of oil or gas and suitable for laying in deep off-shore waters and in particular down to about 3,000 m of depth, at high productions rates, in particular on the order of 2 km/day.

Given the good properties thereof, the alloy according to the invention can also be used advantageously in the context of parts such as described hereinabove.

The invention claimed is:

1. An alloy having the following composition, by weight:

$$16.5\% \leq Cr \leq 25.0\%$$
$$11.0\% \leq Mo \leq 18.0\%$$
$$2.0\% \leq W \leq 7.0\%$$
$$Fe \leq 1.0\%$$
$$Mo + W \leq -0.5 \times (Cr + Fe) + 30\%$$
$$Mo + W \geq -0.5 \times (Cr + Fe) + 25\%$$
$$Ti + Ta \leq 0.80\%$$
$$0.01\% \leq Si \leq 0.75\%$$
$$0.01\% \leq Al \leq 0.35\%$$
$$0.01\% \leq Mn \leq 0.35\%$$
$$Ca \leq 0.005\%$$
$$Mg \leq 0.005\%$$
$$Nb \leq 0.01\%$$
$$0.001\% \leq C \leq 0.05\%$$
$$0.001\% \leq N \leq 0.05\%$$
$$S \leq 0.003\%$$
$$P \leq 0.005\%$$

0.0010%≤rare earths≤0.015%, the silicon content being less than or equal to 0.25% in the presence of rare earths at a content comprised between 0.0010% and 0.015%, the rest being nickel and unavoidable impurities resulting from the manufacturing, the nickel content being greater than or equal to 54%, wherein the alloy has a yield strength of at least 500 MPa.

2. The alloy according to claim 1, wherein the iron content is less than or equal to 0.5% by weight.

3. The alloy according to claim 1, wherein the rare earths are chosen from yttrium, cerium and lanthanum and mixtures thereof.

4. The alloy according to claim 3, wherein the rare earths are chosen from yttrium or a mixture of cerium and lanthanum.

5. A coated part comprising a substrate made of a base material and a coating made of an alloy according to claim 1, the base material being a metallic material.

6. The coated part according to claim 5, wherein the coated part is a tube section.

7. A filler wire made of the alloy according to claim 1.

8. A manufacturing method of a filler wire made of the alloy according to claim 1, the method comprising the following steps:

provicing a semi-finished product made of the alloy;

hot transformation of the semi-finished product to form an intermediate wire; and transformation of the intermediate wire into a filler wire, with a diameter smaller than a diameter of the intermediate wire, said transformation comprising a drawing step.

9. A welded assembly comprising at least two portions of parts, each made of a base material, the portions of parts being joined together by a weld seam obtained from a filler wire made of the alloy according to claim 1, wherein the base material is selected from an iron-nickel alloy, a nickel alloy and a carbon steel.

10. The welded assembly according to claim 9, said welded assembly forming a tube section comprising a sheet metal bent into the shape of a tube, longitudinal edges of which form the portions of parts joined to each other by the weld bead.

11. The welded assembly according to claim 10, wherein the tube section is provided with a coating made of said alloy over at least a portion thereof.

12. The welded assembly according to claim 9, said welded assembly forming a tube comprising at least two tube sections, the tube sections forming the portions of parts, and the weld seam extending along the circumference of the tube.

13. A method for producing a welded assembly according to claim 9, comprising welding together the two portions of parts by means of the filler wire.

14. The method of producing a welded assembly according to claim 13, wherein the welding step is a step of welding together longitudinal edges of a sheet metal.

15. The method of producing a welded assembly according to claim 13, comprising, prior to the welding step, the following successive steps:

supplying a first tube section and a second tube section, each extending along a longitudinal axis, and made of the base material;

positioning of the first and second tube sections in such a way that a longitudinal end of the first tube section is arranged facing a longitudinal end of the second tube section along the longitudinal axis of the first and second tube sections; and wherein the welding step is a step of welding together two longitudinal ends facing the first and second tube sections.

16. A part or portion of a part made of an alloy according to claim 1, said part or portion of a part being obtained by metal additive manufacturing.

17. A method of manufacturing a part or portion of a part, comprising a step of manufacturing said part or portion of a part by a metal additive manufacturing process using, as filler material, a filler wire and/or a powder, wherein each of the filler wire and the powder are made of the alloy according to claim 1.

18. A metallic powder made of an alloy according to claim 1.

19. A method of manufacturing a metal powder made of an alloy said method comprising a step of providing a filler wire made of the alloy claim 1, and a step of plasma atomizing the filler wire, for obtaining the metal powder.

20. An alloy having the following composition, by weight:

$$16.5\% \le Cr \le 25.0\%$$
$$11.0\% \le Mo \le 18.0\%$$
$$2.0\% \le W \le 7.0\%$$
$$Fe \le 1.0\%$$
$$Mo + W \le -0.5 \times (Cr + Fe) + 30\%$$
$$Mo + W \ge -0.5 \times (Cr + Fe) + 25\%$$
$$Ti + Ta \le 0.80\%$$
$$0.01\% \le Si \le 0.75\%$$
$$0.01\% \le Al \le 0.35\%$$
$$0.01\% \le Mn \le 0.35\%$$
$$Ca \le 0.005\%$$
$$Mg \le 0.005\%$$
$$Nb \le 0.01\%$$
$$0.001\% \le C \le 0.05\%$$
$$0.001\% \le N \le 0.05\%$$
$$S \le 0.003\%$$
$$P \le 0.005\%$$

$0.0010\% \le$ rare earths $\le 0.015\%$, the silicon content being less than or equal to 0.25% in the presence of rare earths at a content comprised between 0.0010% and 0.015%, the rest being nickel and unavoidable impurities resulting from the manufacturing, the nickel content being greater than or equal to 54%, wherein the alloy contains a non-zero titanium content and further includes titanium carbonitrides.

* * * * *